United States Patent [19]

Vargiu et al.

[11] 4,069,193

[45] Jan. 17, 1978

[54] MOULDING COMPOSITIONS INCLUDING UNSATURATED POLYESTERS AND AN AMIDE OF AN UNSATURATED ALIPHATIC CARBOXYLIC ACID

[75] Inventors: Silvio Vargiu, Casatenovo, Como; Piero Paparatto, Milan; Antonio Parodi, Monza, Milan; Giorgio Brumat, Verano Brianza, Milan, all of Italy

[73] Assignee: Societa' Italiana Resine S.I.R. S.p.A., Milan, Italy

[21] Appl. No.: 734,347

[22] Filed: Oct. 20, 1976

[30] Foreign Application Priority Data

Oct. 30, 1975 Italy .................................. 28811/75

[51] Int. Cl.$^2$ ....................... C08G 63/54; C08G 63/68
[52] U.S. Cl. ............................ 260/40 R; 260/75 UA; 260/860
[58] Field of Search ............... 260/75 UA, 860, 40 R

[56] References Cited

U.S. PATENT DOCUMENTS

| 2,879,249 | 3/1959 | Raichle et al. | 260/75 UA X |
| 3,467,619 | 9/1969 | Raichle et al. | 260/75 UA X |

*Primary Examiner*—Sandra M. Person
*Attorney, Agent, or Firm*—Christie, Parker & Hale

[57] ABSTRACT

Molding composition comprising an inert filler, from 0.2 to 2 wt.% of an organic peroxide with a decomposition temperature above 70° C, from 0.5 to 10 wt.% of an amide of an unsaturated aliphatic carboxylic acid, and from 10 to 50 wt.% of unsaturated polyester A and/or unsaturated polyester B, wherein said polyester A is the polycondensation product of 2,2'-bis(4-hydroxycyclohexyl)propane or a halogenated derivative thereof with an unsaturated dicarboxylic acid, and said polyester B is the pclycondensation product of an alkylene glycol with an unsaturated dicarboxylic acid and a saturated dicarboxylic acid.

The resulting molded articles are particularly useful in the electrical and electronic fields.

16 Claims, No Drawings

MOULDING COMPOSITIONS INCLUDING UNSATURATED POLYESTERS AND AN AMIDE OF AN UNSATURATED ALIPHATIC CARBOXYLIC ACID

The present invention relates to moulding compositions including an unsaturated polyester or a mixture of two different unsaturated polyesters, and an amide of an unsaturated aliphatic carboxylic acid, and the moulded articles obtained from the said compositions.

Unsaturated polyester resins consisting of the products of the polycondensation of unsaturated polybasic acids with polyvalent alcohols, in solution in styrene or another unsaturated liquid monomer, are known in the art.

The said resins harden under the action of catalysts such as the organic peroxides, possibly used in conjunction with polymerization accelerants, such as, e.g. cobalt naphthenate or octoate.

The unsaturated polyester resins find their main use in combination with reinforcers of a fibrous nature, for preparing manufactured articles commonly known as "reinforced plastics".

The reinforcers commonly used for the purpose are: asbestos, cotton, jute and especially glass, in fibre or fabric form.

Various methods for moulding reinforced unsaturated polyester resins are known, which generally consist of arranging fibrous reinforcer in a suitable mould into which the liquid resin containing the catalyst for hardening is poured, or else the said resin is sucked or injected into the mould. The resin is then hardened at high temperature, possibly under pressure.

Examples of these methods are: direct compression moulding, moulding by suction and injection moulding.

Also known is direct moulding with preforming, which consists of subjecting to moulding a "preform", made of glass fibre impregnated with resin and formed by suction in a suitable chamber, and by thermal treatment of the said deposited material in a current of air.

These processes are somewhat onerous and do not allow high productivity of the moulded objects. The said moulded objects have, moreover, various undesirable characteristics, such as, for example, the smell of the unsaturated monomer used in the resin in combination with the product of polycondensation of the unsaturated polybasic acids with the polyhydroxy alcohols. Finally, there are various difficulties in handling substances such as unsaturated polyester resins.

The thermoplastic resins, unlike the thermosetting ones, are moulded with great ease and speed, in apparatus in which they are first uniformly heated to fluidity and then injected into a mould in which hardening takes place.

The application of such a method to the thermosetting resins involves having available moulding compositions, comprising the thermosetting resin, a hardening catalyst, and an inert filler, possessing the following characteristics:

stability in storage for long periods of time at ambient temperatures;

ability to change into the fluid state within temperature limits in which the phenomenae of premature cross-linking and hardening do not occur appreciably;

ability to harden rapidly at temperatures higher than those necessary to ensure fluidity of the mass.

Preferably, these moulding compositions should be in the form of easily flowing granules having no tendency to release dust.

No moulding compositions, including an unsaturated polyester resin, possessing all the characteristics listed above are known.

Moulding compositions have now been found, which are stable at ambient temperature, fluid within temperature limits in which premature cross-linking and hardening do not occur, and which harden rapidly at high temperatures.

The said compositions, in flowing granular form, free from the tendency to release dust, are converted into moulded articles, by known methods, including injection moulding, in the same way as thermoplastic materials.

The moulded articles thus obtained have an unusual combination of characteristics.

Thus, the invention provides a moulding composition comprising:

a. from 10 to 50 wt.% of unsaturated polyester A and/or unsaturated polyester B, wherein:
said unsaturated polyester A is the polycondensation product of 2,2'-bis(4-hydroxycyclohexyl) propane or a halogenated derivative thereof, and an ethylenically unsaturated discarboxylic acid, having the following characteristics:
  melting point (at the capillary) $>70°$ C
  acid value (mg KOH/g) $<50$
  Gardner viscosity (at 25° C in 60 wt.% solution in styrene) from Y to $Z_3$,
said unsaturated polyester B is the polycondensation product of an alkylene glycol, an ethylenically unsaturated dicarboxylic acid and a saturated discarboxylic acid, having the following characteristics:
  melting point (at the capillary) $\geq 60°$ C
  acid value (mg KOH/g) $<50$
  Gardner viscosity (at 25° C in 60 wt.% solution in styrene) from U to $Z_2$;

b. from 0.5 to 10 wt.% of an amide of an ethylenically unsaturated aliphatic carboxylic acid;

c. from 0.2 to 2 wt.% of an organic peroxide having a decomposition temperature above 70° C;

d. one or more inert fillers.

In addition to the polyesters, the peroxide, the amide and the inert fillers, the moulding composition may also contain small amounts of conventional additives, such as polymerization inhibitors, lubricants, dyes and pigments.

The preferred composition contains from 20 to 35% by weight of unsaturated polyesters A and B, from 4 to 8% by weight of said amide and from 0.5 to 1.8% by weight of said organic peroxide. Particularly satisfactory results are obtained with compositions including the polyester A alone or a mixture of the polyesters A and B containing up to about 30 wt.% of polyester B.

THE UNSATURATED POLYESTER A

As previously stated, the unsaturated polyester A is the polycondensation product of 2,2'-bis(4-hydroxycyclohexyl)propane, or a halogenated derivative thereof, and an ethylenically unsaturated dicarboxylic acid.

By halogenated derivatives of 2,2'-bis(4-hydroxylcyclohexyl)propane are meant the chloro- or bromo- derivatives, in the ring and/or in the propane radical.

The unsaturated dicarboxylic acid is preferably chosen from fumaric and maleic acids.

The unsaturated polyester A which is preferred for the purposes of the present invention has general characteristics in the following ranges of values:

melting point: from 80° to 95° C
acid value: from 15 to 20
Gardner viscosity: from $Z_1$ to $Z_3$ In the preparation of the unsaturated polyester A the reagents are placed in contact and polycondensed at elevated temperature, while removing the water which forms during reaction, until the preselected acid value of the unsaturated polyester is reached.

The molar ratio between 2, 2'-bis(4-hydroxycyclohexyl) propane or its halogenated derivative, and the preselected unsaturated dicarboxylic acid, is preferably maintained during the reaction at a value of from 1.05:1 to 1.1:1.

According to a preferred embodiment, operation is carried out at a temperature of the order of 190°–210° C, removing the water at atmospheric pressure, until the acid value of the unsaturated polyester is from about 50 to about 40, and then at subatmospheric pressure (for example 10–50 mm Hg) until the desired acid value is reached.

The best results are obtained with molar ratios between 2,2'-bis(4-hydroxycyclohexyl)propane or its halogenated derivative and the unsaturated dicarboxylic acid of the order of 1.1:1.

THE UNSATURATED POLYESTER B

As previously stated, the unsaturated polyester B is the polycondensation product of an alkylene glycol and a mixture of ethylenically unsaturated dicarboxylic acid and dicarboxylic acid free from ethylenical unsaturation.

The glycols preferred for the purpose are ethylene and propylene glycols.

The unsaturated dicarboxylic acid is preferably chosen from maleic and fumaric acids, and that free from ethylenical unsaturation from phthalic, isophthalic and terephthalic acids.

The unsaturated polyester B preferred for the purposes of the present invention has general characteristics in the following ranges of values:

melting point from 60° to 80° C
acid value from 15 to 120
Gardner viscosity from W to Y Production of the unsaturated polyester B is completely similar to that of the unsaturated polyester A, the molar ratio between the alkylene glycol and the bicarboxylic acids being preferably from 1.05:1 to 1.1:1 and the molar ratio between the ethylenically unsaturated dicarboxylic acid and that free from ethylenical unsaturation being preferably from 1:1 to 3:1.

Particularly satisfactory results are obtained by polycondensing isophthalic acid, fumaric acid and ethylene glycol in molar ratios of 1:3.0:4.4.

THE AMIDE OF THE UNSATURATED CARBOXYLIC ACID

The amide is preferably chosen from those which can be defined by the general formula:

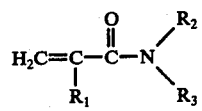

wherein $R_1$, $R_2$, $R_3$ are hydrogen or a lower alkyl group, such as, for example, acrylamide, methacrylamide, N-methylacrylamide and N,N-dimethylacrylamide.

THE ORGANIC PEROXIDE

The organic peroxide suitable for the compositions of this invention has a decomposition temperature higher than 70° C and preferably higher than 120° C.

The said peroxide may be chosen from a wide class of compounds, for example:
dialkyl peroxides, such as di-tert-butyl peroxide;
diaralkyl peroxides, such as dicumyl peroxide;
cyclic peroxides, such as dibenzylidene diperoxide;
peroxy-esters, such as tert-butyl peroxybenzoate and di-tert-butyl perphthalate;
peroxides of the ketal type, e.g. that known commercially as "Trigonox 17/40".

The latter is used in combination with known polymerization accelerants, such as the cobalt, manganese, cerium, nickel and iron salts of organic and particularly cobalt naphthenate and octoate.

THE INERT FILLERS AND THE OTHER CONSTITUENTS OF THE MOULDING COMPOSITIONS

The inert fillers are preferably chosen from silica, calcium carbonate, asbestos and glass fibre. The latter is generally present in the compositions in amounts of from 10 to 55% by weight, preferably in the form of fibres of the order of 3–10 mm in length.

The composition of the present invention generally contains from 20 to 500 ppm (with respect to the unsaturated polyesters) of one or more substances chosen from among those conventionally used in the art to inhibit polymerization of the unsaturated polyester resins.

These inhibitors may be chosen from a wide set of compounds, such as: quaternary ammonium salts, salts of amines, copper salts, nitrophenols, dihydric phenols and their alkyl derivatives.

The moulding composition generally contains from 1 3% by weight of a lubricant, preferably chosen from waxes, stearic acid and zinc, calcium and magnesium stearates. Further additives generally present in the composition are dyes and pigments.

PREPARATION OF THE MOULDING COMPOSITION

The moulding composition of the present invention may be prepared in the following way. All the components except the glass fibre are fed into a ball mill and ground to a grain size of the solid of less than about 10 microns. Then the glass fibre is added, the mass is homogenized in a powder mixer, operating in conditions such that the glass fibre will not be broken, and the homogenized mass is calendered, operating for times of the order of a few minutes and with roller temperatures not above about 100° C, until a sheet of thickness of the order of 1 mm is obtained. This latter is ground, e.g. in a hammer mill, and the resulting granules are sifted in order to separate the fraction having the desired grain size. A moulding composition in the form of granules from 100 to 5000 microns, is thus obtained. Absence of particles with dimensions less than 100 microns is preferable, or, at least, such particles should not exceed 5% by weight of the composition.

According to another procedure, after homogenization with the glass fibre, the composition is extruded, and the granulate is obtained by means of "in-head cutting" of the extrudate.

The composition is stable at ambient temperatures for a period of time greater than 3 months and generally up to 6 months, especially if kept in watertight bags, e.g. of polythene or polythene paper. Storage temperatures below the ambient temperature cause no damage. Moreover the said composition has no tendency to release dust.

The composition becomes fluid and flowing at a temperature from 120° to 130° C and at these temperatures it has a "plastic life" or useful time for working greater than 125 seconds up to 15 minutes or more.

Hardening occurs at temperatures of from 145° to 180° C, in times of the order of from 100 to 10 seconds.

The data relating to the "plastic life" and to the hardening speed were detemined by means of the Brabender rheometer from Bradender Instruments Inc.

More particularly the said rheometer comprises a cell with a device with rotors which can rotate at different speeds. The whole system is thermostatted.

The moulding composition is fed into the cell. Under the action of the temperature and the friction of the rotors, the composition undergoes both physical and chemical changes.

The resistance with which the composition opposes the action of the rotors, expressed as a turning moment in revolutions per minute, is measured and recorded as a function of time.

It is thus possible to determine the softening, melting and hardening cycles of the composition under examination, obtaining useful data for injection moulding.

PREPARATION OF MOULDED ARTICLES

Preparation of the moulded articles can be effected by normal methods of compression, transfer and injection moulding, using moulding cycles which are speedy and completely automatic.

In direct compression moulding the mould can be filled at pressure of from 12 to 250 Kg/cm$^2$, especially depending on the geometry of the article, with optimal moulding temperatures of from 145° to 165° C.

In transfer moulding the best results are obtained with directly incorporated chamber moulds, with the feed heads as short as possible and with a single injection per cavity. Moulding temperatures are of the order of 145°–155° C.

The best results are achieved by injection moulding in which the moulding composition is made fluid by screw-type extrusion and then injected into the mould where it undergoes hardening.

In each case hardening occurs without generation of gaseous by-products.

The resulting moulded articles have a great dimensional stability at elevated temperature, exceptionally low shrinkage values, and excellent electrical properties which remain unchanged under different environmental conditions.

The said moulded articles possess, moreover, good mechanical characteristics, very good resistance to chemical reagents, a low water absorption and can easily be coloured.

In particular, the said moulded articles possess electrical characteristics similar to those of conventional products used for the purpose, such as glass and ceramics, the said characteristics being distinctly superior to those of products manufactured from thermosetting resins such as pheno, urea and melamine resins, and also to those manufactured from the usual thermoplastic resins.

The manufactured articles of the present invention, moreover, show distortion temperatures under load (Martens degree) clearly superior to those made from the conventional thermoplastic resins.

In conclusion, the moulded articles of the present invention possess a whole collection of characteristics such as to render them useful in a wide range of applications and particularly for the construction of electrical and electronic equipment parts, such as: reels for coils, boxes for low and medium tension switches, insulators in general, connector blocks, fairleads, terminals, handles, insulating supports and fans for electric motors.

EXAMPLE 1

PREPARATION OF THE UNSATURATED POLYESTER A

Into a flask fitted with an agitator there are fed 264.4 parts by weight of 2,2'-bis(4-hydroxycyclohexyl) propane and 116 parts by weight of fumaric acid, the molar ratio between the two reagents being thus equal to 1.1:1.

A current of nitrogen is caused to flow over the surface and the reagents are melted by heating to 170°–180° C. They are then heated to 200°–205° C, whilst the temperature is maintained at the swan neck at about 105° C. The said temperatures are maintained until an acid value or the order of 40–50 is reached.

A subatmospheric pressure (20 mm Hg) is then applied and the temperature is maintained at 200°–205° C until an acid value of the unsaturated polyester A of less than 20 is reached.

100 ppm of para-tert-butyl catechol are added and the mass is cooled and discharged.

The unsaturated polyester A thus obtained has the following characteristics:
  melting point: 91° C
  acid value: 17.6
  Gardner viscosity: $Z_2 + \frac{1}{2}$ The melting point is determined at the capillary; the acid value is the number of milligrams of potassium hydroxide used to neutralize one gram of unsaturated polyester A; the Gardner viscosity is determined at 25° C in a 60% solution by weight of the unsaturated polyester A in styrene.

EXAMPLE 2

PREPARATION OF THE UNSATURATED POLYESTER B

Operation is carried out according to the procedure of Example 1, charging the flask with 166 parts by weight of isophthalic acid, 348.2 parts by weight of fumaric acid and 335 parts by weight of propylene glycol, the molar ratio between the reagents being thus equal to 1:3.0:4.4.

The resulting unsaturated polyester B has the following characteristics:
  melting point (at the capillary): 62°–67° C
  acid value (mg KOH/g): 17.8
  Gardner viscosity (at 25° C, in a 60% solution in styrene): $X + \frac{1}{3}$

EXAMPLE 3

One prepares a moulding composition including the unsaturated polyesters A and B (whose preparation has been described in Examples 1 and 2, respectively), and acrylamide.

The components of the composition are indicated in Table 1. In the said Table 1 the amounts of the components are given in parts by weight. Finally, the silica used is that known commercially as "Aerosil".

The preparation of the composition is carried out in the following manner:

all the components, excepting the glass fibre, are fed into a ball mill and ground to a grain size of less than about 100 microns. Then the glass fibre is added and the mass is homogenized.

The homogenized mass is calendered, working under the following conditions:

first roller temperature: 100° C
second roller temperature: 85° C
speed of the two rollers: 20 revolutions/minute
working time: 2 minutes
thickness of the sheet produced: 1 mm.

The sheets produced by calendering are ground in a hammer mill, having a net with a 5 mm mesh.

The characteristics of the resulting granulate are reported in Table 2.

As to the results of Table 2:

the apparent density was determined in accordance with the DIN 53.468 standard;
the hardening time was determined by introducing the composition into a bowl shaped mould of the UNI 4272 type and putting it under a load of 5,000 kg., at a temperature of 150° C; the time in seconds elapsing between the closing of the mould and the formation of a bowl without surface defects (blisters) defines the hardening time;
the flow index was determined by introducing the composition into a bowl shaped mould of the UNI 4272 type, at the prefixed temperature of 150° C and applying a load of 5,800 kg by means of hydraulic press; at the instant at which the needle of the manometer, connected to the press, shows an increase in pressure, the chronometer is started; when the upper plane of the press has finished its descent, the chronometer is stopped; the intervening time, expressed in seconds, is the flow index;
fluidity on a disc was determined by placing 50 grams of the composition at the centre of a disc-shaped mould, having a diameter of 32 cm and with 6 concentric circles drawn on the said mould; a pressure of 40,000 kg is applied for 60 seconds, operating at 150° C; the speed of closing of the press is at 0.3 cm/second, the fluidity of the composition is expressed as the number of circles impressed on the disc;
packing was estimated by placing 100 grams of the composition in a 250 ml beaker with a 66 mm inner diameter under a pressure of 15.1 g/cm$^2$; after 45 days at 38° C the composition is sifted through sieves of 20, 40 and 50 mesh and the quantity of material remaining on each sieve as well as the consistency of the lumps is evaluated: the handling consistency of the lumps is expressed by words: non friable, a little friable, friable.

Under the moulding conditions, there are no adherences to the walls of the moulds, either chromium plated or not, and it is not necessary to lubricate the said moulds.

Test bars of the resulting granulate are moulded with dimensions 10×15×120 mm, according to UNI standards.

The moulding conditions are reported in Table 3.

The characteristics reported in Table 4, have been determined on the test pieces.

EXAMPLES 4 and 5

One operates under the conditions of Example 3, using different amounts of acrylamide and unsaturated polyesters A and B.

The results are reported in Tables 1 to 4.

EXAMPLE 6

One operates as in Example 3 to prepare a moulding composition including the unsaturated polyester A and acrylamide.

The results are reported in Tables 1 to 4.

Table 1

|  | Ex. 3 | Ex. 4 | Ex. 5 | Ex. 6 to 8 |
|---|---|---|---|---|
| Unsaturated polyester A | 19.0 | 18.0 | 17.0 | 25.0 |
| Unsaturated polyester B | 7.0 | 6.0 | 5.0 | — |
| Acrylamide | 1.0 | 3.0 | 5.0 | 2.0 |
| Dicumyl peroxide | 1.4 | 1.4 | 1.4 | 1.4 |
| Zinc stearate | 2.5 | 2.5 | 2.5 | 2.5 |
| Silica | 5.0 | 5.0 | 5.0 | 5.0 |
| Calcium carbonate | 14.1 | 14.1 | 14.1 | 14.1 |
| Asbestos powder | 20.0 | 20.0 | 20.0 | 20.0 |
| Glass fibre (chopped strands) | 30.0 | 30.0 | 30.0 | 30.0 |

Table 2

|  |  | Example 3 | Example 4 | Example 5 | Examples 6-8 |
|---|---|---|---|---|---|
| Apparent density (g/l) |  | 700 | 700 | 700 | 650 |
| Hardening time at 150° C (sec) |  | 120 | 50 | 40 | 90 |
| Flow index at 150° C (sec) |  | 8 | 3 | 1-2 | 5 |
| Fluidity on a disc |  | 7½ | 7¾ | 8 | 7 |
| Packing |  | a little friable | a little friable | a little friable | a little friable |
| Stability in storage (months) |  | >3 | >3 | >3 | >3 |
| Moulding in chromium plated moulds |  | no adherence | no adherence | no adherence | no adherence |
| Moulding in non-chromed moulds |  | no adherence | no adherence | no adherence | no adherence |
| Grain size (micron) | 4000 | 2-5% | 2-5% | 2-5% | 2-5% |
|  | 1250 | 60-63% | 60-63% | 60-63% | 60-63% |
|  | 500 | 25-27% | 25-27% | 25-27% | 25-27% |
|  | 250 | 5-7% | 5-7% | 5-7% | 5-7% |
|  | 100 | 3-4% | 3-4% | 3-4% | 3-4% |
|  | <100 | 3-4% | 3-4% | 3-4% | 3-4% |

Table 3

| | Ex. 3 | Ex. 4 | Ex. 5 | Ex. 6 | Ex. 7 | Ex. 8 |
|---|---|---|---|---|---|---|
| Temperature (° C) | 160±2 | 160±2 | 160±2 | 160±2 | 160±2 | 160±2 |
| Pressure (Kg/cm$^2$) | 200 | 200 | 200 | 200 | 50 | 12 |
| Time (sec/mm of thickness) | 90 | 60 | 60 | 90 | 90 | 90 |

Table 4

| | Ex. 3 | Ex. 4 | Ex. 5 | Ex. 6 | Ex. 7 | Ex. 8 |
|---|---|---|---|---|---|---|
| Bending strength (Kg/cm$^2$) DIN 53452 | 545 | 595 | 610 | 500 | 500 | 500 |
| Impact resistance (Kg.cm/cm$^2$) DIN 53453 | 4.0 | 4.3 | 4.5 | 4.4 | 4.4 | 4.5 |
| Impact resistance with notch (Kg.cm/cm$^2$) DIN 53453 | 3.0 | 3.0 | 3.0 | 3.2 | 3.2 | 3.2 |
| Martens degree (° C) DIN 53458 | 147 | 150 | 154 | 140 | 140 | 140 |
| Shrinkage (%) DIN 53464 | 0.6 | 0.6 | 0.6 | 0.6 | 0.6 | 0.6 |
| Post-shrinkage (%) DIN 53464 | 0.08 | 0.08 | 0.08 | 0.05 | 0.05 | 0.05 |
| Water absorption (mg) DIN 53472 | 35 | 35 | 50 | 40 | 40 | 40 |
| Surface resistance (ohm) DIN 53482 | $10^{13}$ | $10^{13}$ | $10^{13}$ | $6.10^{13}$ | $6.10^{13}$ | $6.10^{13}$ |
| Volume resistance (ohm/cm) DIN 53482 | $10^{14}$ | $10^{14}$ | $10^{14}$ | $6.10^{14}$ | $6.10^{14}$ | $6.10^{14}$ |
| Dissipation factor (tg$\rho$) DIN 53483 | 0.045 | 0.045 | 0.045 | 0.029 | 0.029 | 0.029 |
| Dielectric strength (Kv/mm) DIN 53481 | 5.5 | 5.5 | 5.5 | 5.1 | 5.1 | 5.1 |
| Tracking resistance DIN 53480 | KA2 | KA2 | KA2 | KA2 | KA2 | KA2 |
| Degree of incandescence (degree) DIN 53459 | 2 | 2 | 2 | 2 | 2 | 2 |

We claim:

1. A granular molding composition suitable for injection molding comprising:
   a. from 10 to 50 wt.% of unsaturated polyester A and/or unsaturated polyester B, wherein:
   said unsaturated polyester A is the polycondensation product of 2,2'-bis(4-hydroxycyclohexyl) propane or a halogenated derivative thereof, and an ethylenically unsaturated dicarboxylic acid, having the following characteristics:
      melting point (at the capillary) > 70° C
      acid value (mg KOH/g) < 50
      Gardner viscosity (at 25° C in 60 wt.% solution in styrene) from Y to $Z_3$;
   said unsaturated polyester B is the polycondensation product of an alkylene glycol, an ethylenically unsaturated dicarboxylic acid and a saturated dicarboxylic acid, having the following characteristics:
      melting point (at the capillary) ≧ 60° C
      acid value (mg KOH/g) < 50
      Gardner viscosity (at 25° C in 60 wt.% solution in styrene) from U to $Z_2$;
   b. from 0.5 to 10 wt.% of an amide of an ethylenically unsaturated aliphatic carboxylic acid;
   c. from 0.2 to 2 wt.% of an organic peroxide having a decomposition temperature above 70° C; and
   d. one or more inert fillers.

2. The molding composition of claim 1, which comprises from 20 to 35 wt.% of said polyesters A and B, from 4 to 8 wt.% of said amide and from 0.5 to 1.8 wt.% of said organic peroxide.

3. The molding composition of claim 1, in which said unsaturated dicarboxylic acid of polyesters A and B is selected from the group consisting of fumaric and maleic acids.

4. The molding composition of claim 1, in which said unsaturated polyester A has a melting point from 80° to 95° C, an acid value from 15 to 20 and a Gardner viscosity from $Z_1$ to $Z_3$.

5. The molding composition of claim 1, in which said unsaturated dicarboxylic acid is selected from the group consisting of phthalic, isophthalic and terephthalic acids.

6. The molding composition of claim 1, in which the molar ratio between said unsaturated dicarboxylic acid and said unsaturated dicarboxylic acid in said polyester B is from 1:1 to 3:1.

7. The molding composition of claim 1, in which said unsaturated polyester B has a melting point friom 60° to 80° C, an acid value from 15 to 20 and a Gardner viscosity from W to Y.

8. The molding composition of claim 1 in which said amide is a compound of the formula:

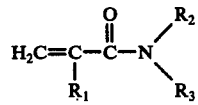

wherein $R_1$, $R_2$ and $R_3$ are selected from the group consisting of hydrogen atoms and lower alkyl radicals.

9. The molding composition of claim 1, in which said amide is selected from the group consisting of acrylamide, methacrylamide, N-methylacrylamide and N,N-dimethylacrylamide.

10. The molding composition of claim 1, in which said inorganic peroxide has a decomposition temperature above 120° C.

11. The molding composition of claim 1, in which said organic peroxide is selected from the group consisting of dialkyl peroxides, diaralkyl peroxides, cyclic peroxides, peroxyesters and peroxides of the ketal type.

12. The molding composition of claim 1, in which said organic peroxide is selected from the group consisting of di-tert-butyl peroxide, dicumyl peroxide, dibenzylidene diperoxide, tert-butyl peroxybenzoate and di-tert-butyl perphthalate.

13. The molding composition of claim 1, in which said inert filler is selected from the group consisting of silica, calcium carbonate, asbestos and glass fibre.

14. The molding composition of claim 1, which comprises from 10 to 55% by weight of glass fibre as inert filler.

15. The molding composition of claim 1, which comprises from 20 to 500 ppm with respect to the unsaturated polyesters, of a polymerization inhibitor selected from the group consisting of quaternary ammonium salts, salts of amines, salts of copper, nitrophenols, dihydric phenols and their alkyl derivatives.

16. The molding composition of claim 1, which comprises from 1 to 3% by weight of a lubricant selected from the group consisting of waxes, stearic acid and stearates of zinc, calcium and magnesium.

* * * * *

UNITED STATES PATENT AND TRADEMARK OFFICE
CERTIFICATE OF CORRECTION

PATENT NO. : 4,069,193
DATED : January 17, 1978
INVENTOR(S) : Vargiu, Paparatoo, Parvdi, Brumat It is certified that error appears in the above–identified patent and that said Letters Patent are hereby corrected as shown below:

Col. 2, line 27 "discarboxylic" should read --dicarboxylic--
Col. 2, line 34 "discarboxylic" should read --dicarboxylic--
Col. 3, line 46 "120" should read --20-- Col. 4, line 21 After the word "organic" insert --acids-- Col. 5, line 68 The word "pheno" should read --phenol-- Col. 6, line 29 The word "or" should be --of-- Col. 8, line 36 After line 36 add --Examples 7 and 8

Operation is as in Example 6, the moulding pressure being varied.

The results are reported in Tables 1 to 4.--
Col. 9, line 27 "(tgp)" should read -- (tg6)--
Col. 10, line 37 The word "friom" should read --from--

Signed and Sealed this

Twenty-ninth Day of August 1978

[SEAL]

Attest:

RUTH C. MASON
Attesting Officer

DONALD W. BANNER
Commissioner of Patents and Trademarks